(12) United States Patent
Dalla Corte et al.

(10) Patent No.: US 10,626,514 B2
(45) Date of Patent: Apr. 21, 2020

(54) ION-SELECTIVE COMPOSITE MATERIALS AND METHOD OF PREPARATION

(71) Applicants: Massachusetts Institute of Technology, Cambridge, MA (US); Total Marketing Services

(72) Inventors: Daniel A. Dalla Corte, Fontenay-sous-Bois (FR); Brice H. V. Chung, Boston, MA (US); Dheevesh V. Arulmani, Cambridge, MA (US); Donald R. Sadoway, Cambridge, MA (US)

(73) Assignees: Massachusetts Institute of Technology, Cambridge, MA (US); Total Energies Nouvelles Activites USA, Courbevoie (FR); Total S.A., Courbevoie (FR)

( * ) Notice: Subject to any disclaimer, the term of this patent is extended or adjusted under 35 U.S.C. 154(b) by 219 days.

(21) Appl. No.: 15/498,909

(22) Filed: Apr. 27, 2017

(65) Prior Publication Data

US 2018/0312986 A1 Nov. 1, 2018

(51) Int. Cl.
| | |
|---|---|
| *H01M 10/0562* | (2010.01) |
| *H01M 10/39* | (2006.01) |
| *H01M 2/16* | (2006.01) |
| *C25C 7/04* | (2006.01) |
| *C25C 3/00* | (2006.01) |
| *H01M 8/0243* | (2016.01) |
| *H01M 10/0525* | (2010.01) |
| *H01M 10/054* | (2010.01) |
| *H01M 8/0245* | (2016.01) |

(52) U.S. Cl.
CPC .............. *C25C 7/04* (2013.01); *C25C 3/00* (2013.01); *H01M 2/1646* (2013.01); *H01M 8/0243* (2013.01); *H01M 8/0245* (2013.01); *H01M 10/054* (2013.01); *H01M 10/0525* (2013.01); *H01M 10/0562* (2013.01); *H01M 10/3909* (2013.01); *H01M 10/399* (2013.01); *H01M 2220/10* (2013.01); *H01M 2300/0048* (2013.01); *H01M 2300/0068* (2013.01)

(58) Field of Classification Search
CPC ............ H01M 2/1646; H01M 8/0243; H01M 8/0245; H01M 10/0525; H01M 10/054; H01M 10/0562; H01M 10/3909; H01M 10/399; H01M 2220/10; H01M 2300/0048; H01M 2300/0068; C25C 3/00; C25C 7/04
See application file for complete search history.

(56) References Cited

U.S. PATENT DOCUMENTS

2016/0013463 A1* 1/2016 Roumi ................ H01M 2/1673
429/145

* cited by examiner

*Primary Examiner* — Brittany L Raymond
(74) *Attorney, Agent, or Firm* — Sunstein LLP

(57) ABSTRACT

An electrochemical cell includes a positive electrode, a negative electrode, an electrolyte disposed between the positive electrode and the negative electrode, and an ion-conducting composite membrane disposed between the positive electrode and the negative electrode. The composite membrane includes a porous substrate having pores and a porosity from about 5 vol % to about 80 vol %, and a selective ion-conductive filler disposed at least partially within the pores. The filler includes an intercalation material. Methods of making the ion-conducting composite membrane and using an electrochemical cell having the ion-conducting composite membrane are also provided.

22 Claims, 4 Drawing Sheets

Cross-sectional SEM view of a composite membrane CARBON-TiO$_2$

ION-SELECTIVE COMPOSITE MATERIALS AND METHOD OF PREPARATION

TECHNICAL FIELD

The present invention relates to electrochemical cells, and more particularly to electrochemical cells having ion-conductive membranes.

BACKGROUND

Electrical energy generation in industrialized countries like the United States relies on a variety of energy sources that are then converted into electricity, such as fossil, nuclear, solar, wind and hydroelectric. Apart from the concern of the dwindling supply of fossil fuel, one of the great challenges of energy supply chains is balancing supply with demand. Part of the problem is the inability to store electrical energy in an efficient way so that it can be turned on or off to match high or low energy demand. For example, some sources of energy, such as a nuclear plant, cannot easily be switched off and on or in the cases of the renewable resources, such as wind or solar power, are dependent on natural forces beyond our control which may not be productive when needed or become productive when not needed. These factors represent a difficulty in the integration of such renewable sources in the power grid.

Several battery technologies suitable for large-scale applications have been developed to achieve grid-scale integration for intermittent renewable energy sources. Particularly prominent are molten salt electrochemical cells, for example the sodium sulfur battery (or NaS battery) and the Na—NiCl$_2$ battery (or ZEBRA battery). Such cells are based on high temperature electrochemical systems which rely on the use of selective ion-conductive membranes. Beta-alumina solid electrolyte (BASE) is used as a membrane in several types of molten salt electrochemical cells because of its properties as fast ion conductor. Unlike more common forms of alumina, BASE has been characterized as having a layered structure with open galleries separated by pillars. Sodium ions (Na$^+$) migrate through this material readily since the oxide framework provides an ionophilic, non-reducible medium.

However, alumina is brittle and hard to machine into desired shapes. As such, the production of defect-free alumina membranes usually involves the use of complex ceramic fabrication techniques, with a need for high temperature processes and pronounced limitations in shapes attainable in the final product. Complexity in the fabrication process has direct consequences in the cost of the membranes, while limitations with regard to which membrane shapes are attainable affect the applicability and performance of the resulting electrochemical systems. Under such fabrication constraints, the membrane becomes a cost-driving component for the battery and limits the number of possible large-scale applications, as a membrane having a geometry suitable to the application at hand may be too expensive, if not impossible, to manufacture.

SUMMARY OF THE EMBODIMENTS

In one embodiment, an electrochemical cell includes a positive electrode, a negative electrode, an electrolyte disposed between the positive electrode and the negative electrode, and an ion-conducting composite membrane disposed between the positive electrode and the negative electrode. The composite membrane includes a porous substrate having pores and a porosity from about 5 vol % to about 80 vol %, and a selective ion-conductive filler disposed at least partially within the pores. The filler includes an intercalation material.

In another embodiment, a method of operating an electrochemical cell includes providing the electrochemical cell having a positive electrode, a negative electrode, an electrolyte disposed between the positive electrode and the negative electrode, and an ion-conducting composite membrane disposed between the positive electrode and the negative electrode. The composite membrane includes a porous substrate having pores and a porosity from about 5 vol % to about 80 vol %, and a selective ion-conductive filler disposed at least partially within the pores. The filler includes an intercalation material. The method further includes establishing an electrically conductive connection between an external circuit and the positive electrode and the negative electrode, and operating the external circuit so as to convert electrical energy into chemical energy in the cell or to convert chemical energy from the cell into electrical energy by driving transfer of ions through the composite membrane.

In related embodiments, the porous substrate may include a material selected from the group consisting of graphite, glassy carbon, nickel, tungsten, stainless steel, magnesium oxide, and/or boron nitride. The intercalation material may be selected from the group consisting of transition metal oxides, metal dichalcogenides, olivines, tavorites, spinels, and/or layered materials. The intercalation material may be selected from the group consisting of LiTiO$_2$, LiMnO$_2$, LiFeO$_2$, LiCoO$_2$, LiNiO$_2$, TiS$_2$, VS$_2$, TiSe$_2$, NbSe$_2$, LiVS$_2$, LiTiSe$_2$, LiNbSe$_2$, LiFePO$_4$, LiMnPO$_4$, Li(Mn$_x$Fe$_{1-x}$)PO$_4$, Li(Mn$_x$Co$_{1-x}$)PO4, Li(Mn$_x$Co$_y$Ni$_z$)PO$_4$, Li$_2$FeSiO$_4$, LiFeSO$_4$F, LiVPO$_4$F, LiMn$_2$O$_4$, LiNi$_{0.5}$Mn$_{0.5}$O$_4$, Li$_4$Ti$_5$O$_{12}$, LiNi$_{0.33}$Mn$_{0.33}$Co$_{0.33}$O$_2$, LiNi$_{0.5}$Mn$_{0.5}$O$_2$, Na$_x$CoO$_2$, Na$_x$MnO$_2$, Na$_x$FeO$_2$, Na$_x$CrO$_2$, Na[Ni$_{0.33}$Fe$_{0.33}$Mn$_{0.33}$]O$_2$, NaFePO$_4$, NaFe$_{0.5}$Mn$_{0.5}$PO$_4$, NaVPO$_4$F, Na$_3$V$_2$(PO$_4$)$_2$F$_3$, and/or Na$_{1.5}$VOPO$_4$F$_{0.5}$. The selective ion-conductive filler may conduct an ion of an element selected from the group consisting of hydrogen, Li, Na, K, Ca, Mg, Fe, Fe, Sn, Co, Cu, Ag, and/or Au. The porous substrate may have an average pore diameter of about 100 nm to about 100 μm. The electrochemical cell may be an energy storage device, an electrolytic cell, and/or a fuel cell. For example, the electrochemical cell may be a molten salt battery, such as a sodium-sulfur battery and/or a sodium-nickel chloride battery. When the electrochemical cell is an electrolytic cell, the ions may be metal ions, such as Li, Na, K, Ca, Mg, Fe, Fe, Sn, Co, Cu, Ag, and/or Au.

In another embodiment, a method for manufacturing an ion-conducting composite membrane for use within an electrochemical cell includes providing a porous substrate having pores and a porosity from about 5 vol % to about 80 vol %, contacting the porous substrate with a selective ion-conductive filler precursor, and processing the precursor to form a selective ion-conductive filler disposed at least partially within the pores. The filler includes an intercalation material.

In related embodiments, the precursor may be in a sol-gel solution and the processing may include gelling and curing the sol-gel solution. The sol-gel solution may further include a viscosity adjuster. The processing may further include thermally curing the precursor. The precursor may be in a vapor and the processing may be chemical vapor deposition, sputter deposition, pulsed laser deposition, and/or electron beam deposition.

BRIEF DESCRIPTION OF THE DRAWINGS

The foregoing features of embodiments will be more readily understood by reference to the following detailed description, taken with reference to the accompanying drawings, in which.

DEFINITIONS

As used in this description and the accompanying claims, the term "diameter" of a given item refers to the greatest cross-sectional dimension of the item.

As used in this description and the accompanying claims, the term "battery" may encompass individual electrochemical cells or cell units having a positive electrode, a negative electrode, and an electrolyte, as well as configurations having an array of electrochemical cells.

As used in this description and the accompanying claims, the term "intercalation material" refers to a material with the capability to reversibly intercalate and deintercalate a chemical species, such as an alkali metal. For example, lithium intercalation into and deintercalation from transition metal oxide intercalation material $MO_2$ (where M is usually a transition metal) can be expressed as $MO_2 + xLi^+ + xe^- \leftrightarrow Li_xMO_2$, where x is the coefficient for lithium intercalation. For simplicity's sake, such intercalation materials are often referred to as $LiMO_2$, but this notation does not imply that coefficient x is always equal to 1. Rather, those of skill in the art will recognize that such coefficient may range from 0 to quantities greater than 1 depending on the amount of Li intercalated in the material. Analogous considerations apply to other types of intercalation materials.

DETAILED DESCRIPTION OF SPECIFIC EMBODIMENTS

Figure 1:
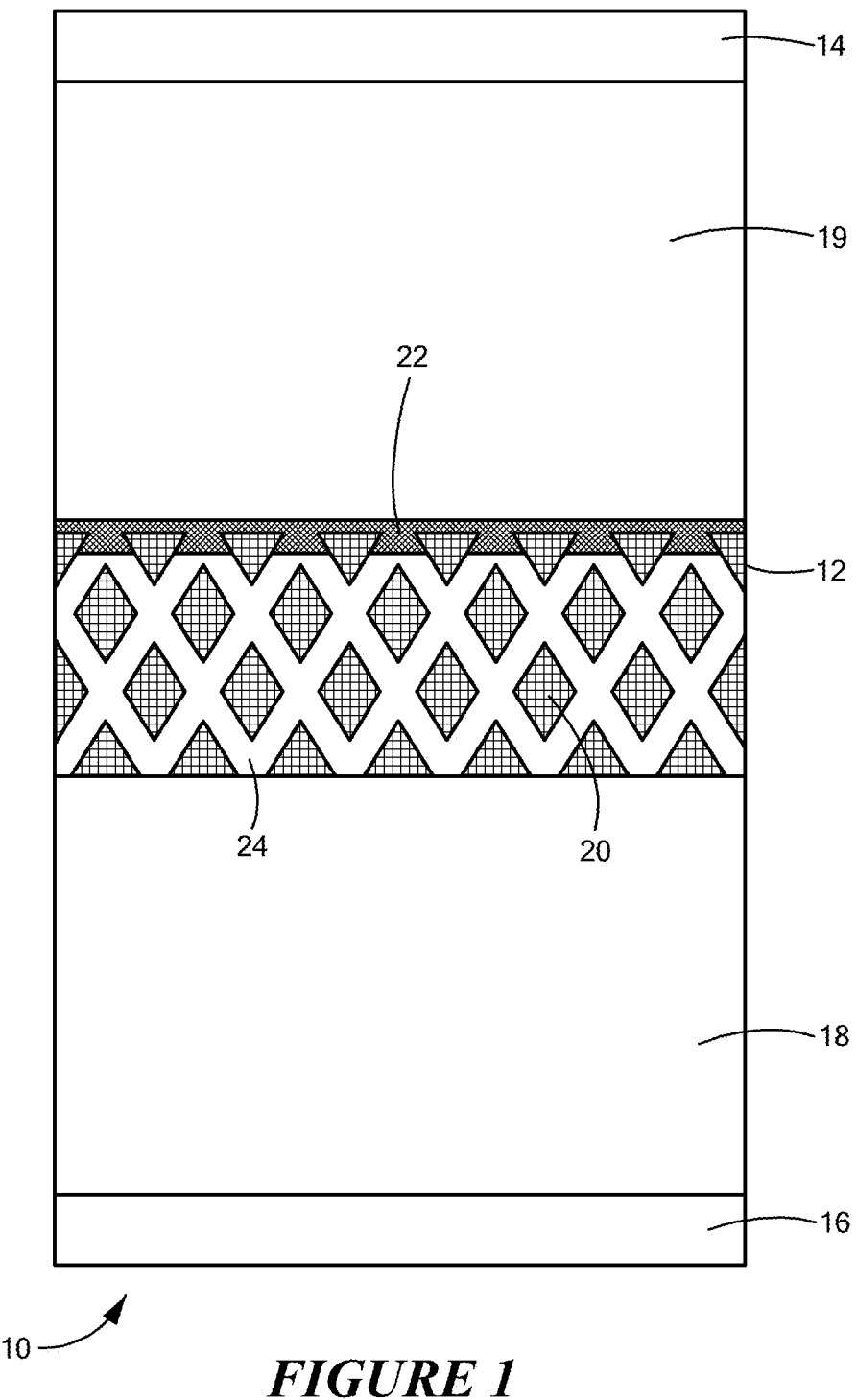
FIG. 1 illustrates a cross-sectional view of an example electrochemical cell featuring a composite ion-conducting membrane according to embodiments of the present invention.

As exemplified in FIG. 1, embodiments of the invention significantly decrease the complexity and cost of manufacturing an electrochemical cell 10 having a selective ion-conductive composite membrane 12 disposed between a positive electrode 14 and a negative electrode 16 while at the same time minimizing geometrical constraints for the final product. In some embodiments, the electrochemical cell 10 includes electrolytes 19, 18 disposed between composite membrane 12 and positive and negative electrodes 14 and 16, respectively. Electrolytes 18 and 19 may have the same or different chemical compositions. For instance, in embodiments featuring molten batteries, the composite membrane may rest in the middle of a molten salt layer separating the electrodes. However, embodiments where the positive electrode 14 forms a first direct interface with composite membrane 12 and negative electrode 16 forms a second direct interface with composite membrane 12 are also contemplated.

These advances are made possible by a novel type of composite membrane 12 combining a shape-defining substrate 20 and a selective ion-conductive filler 22 including an intercalation material disposed within at least a portion of the substrate 20, as illustrated in FIG. 1. This results in a composite membrane 12 featuring both the structural and mechanical properties of the substrate 20 and the ion conducting capabilities of the filler 22. Accordingly, the shape and size of the substrate 20 can be adapted to match the structural requirements of a given electrochemical cell design, thereby making feasible designs that would have been impossible or prohibitively expensive to attain with traditional membranes.

The fabrication of an ion selective composite membrane 12 based on intercalation materials opens the possibility of exploring a new functionality of an entire family of compounds. Intercalation materials have been extensively explored as electrode materials for batteries, especially in the case of lithium intercalating materials in Li-ion battery cathodes. However, as disclosed in the present application, intercalation materials make possible the selective ionic conductivity in composite membranes 12. This allows for facilitated synthesis methods to produce ion-conductive composite membranes 12, such as by sol-gel techniques.

Membrane Substrates

The porous substrate 20 provides the structural and mechanical properties of the entire composite membrane 12. It is preferably made of a material that can be shaped in a variety of geometries to suit the application at hand, for example to provide a membrane fitting the size and design of a given battery cell 10. With the porous substrate 20 providing structural support to the composite membrane 12, the amount of ion-conductive filler 22 can be reduced to the minimum quantity required to establish a desired level of ion conductance without affecting the mechanical properties of the composite membrane 12. Decreasing the amount of ion conductive filler 22 reduces the expense for manufacturing the composite membrane 12, which is usually driven by the high cost of ion conducting materials. Moreover, a reduced amount of ion conductive filler 22 decreases the resistance for ionic conduction caused by long diffusional paths across the composite membrane 12.

Accordingly, the substrate 20 is preferably of a material having a porosity sufficient to establish ion conduction when an ion-conducting filler 22 is disposed at least partially within pores 24. Materials having higher levels of porosity may also serve as the substrate 20, if desired. In representative embodiments, the porosity of the substrate 20 is about 5 vol % to about 80 vol %. Preferably, the porosity of the substrate 20 is about 7 vol % to about 15 vol %. More preferably, the porosity of the substrate is about 10 vol % to about 14 vol %. The average diameter of the pores 24 is preferably about 100 nanometers (nm) to about 100 micrometers (μm).

The porous substrate 20 is preferably crafted from a chemically inert material which does not react with compounds present in the electrochemical cell 10 to which the composite membrane 12 is disposed. Non-limiting examples of porous materials that are suitable for the porous substrate 20 include carbonaceous materials, such as porous graphite carbon and glassy carbon; non-oxide porous ceramics, silicon carbide, siliconcarbonitride, and boron nitride; and metal oxide porous ceramics, such as magnesium oxide and aluminum titanate. Preferred porous materials include meshes of metallic materials such as stainless steel, copper, nickel, tungsten, titanium, aluminum, silver, gold, platinum, and metal alloys.

Intercalation Materials

In exemplary embodiments, the ion-conductive filler 22 includes an intercalation material which selectively and reversibly intercalates and deintercalates one or more ions and enables ions to migrate through the intercalation material, for instance from a positive electrode 14 to a negative electrode 16, and vice versa. Without wishing to be bound to any particular theory, it is believed that ions migrate in a push-pop fashion in which an entering ion of one type ejects an ion of the same type from the intercalation material. For example, during discharge of a battery, a lithium negative electrode 16 and a composite membrane 12 with a lithium intercalation material can transfer a lithium cation to a positive electrode 14 by a process in which a lithium cation formed at the negative electrode 16 interacts with the composite membrane 12 to eject a lithium cation from the composite membrane 12 into the positive electrode 14. The lithium cation formed at the negative electrode 16 in such a case need not necessarily migrate to the positive electrode 14. The cation can be formed at an interface between the negative electrode 16 and the composite membrane 12, and accepted at an interface of the positive electrode 14 and the composite membrane 12.

Preferably, the ion-conductive filler 22 conducts one or more ions of the elements hydrogen, lithium, sodium, potassium, calcium, magnesium, iron, tin, cobalt, copper, silver, and gold. In representative embodiments, the ion-conductive fillers 22 include a material capable of reversibly intercalating an alkali metal (e.g., lithium or sodium). Accordingly, in instances where the alkali metal is lithium, traditional rechargeable battery cathode materials, such as layered $LiCoO_2$ and $LiNi_xMn_yCo_zO_2$, spinels $LiMn_2O_4$ and $LiNi_{0.5}Mn_{1.5}O_4$, and olivines $LiFePO_4$ and $LiMnPO_4$ can find a new use in the conduction of lithium ions across the composite membranes 12 of the present application.

Lithium transition metal oxides (usually referred to as $LiMO_2$ where M is a transition metal) are among the most common cathode materials that can be refigured as lithium ion-conductive fillers 22 in the composite membranes 12 of the present application. Representative lithium transition metal oxides include $LiTiO_2$, $LiMnO_2$, $LiFeO_2$, $LiCoO_2$, and $LiNiO_2$. Another representative class of lithium intercalation materials includes those formed by lithium intercalated in metal dichalcogenides of general formula $ME_2$, where M is a transition metal and E is either S, Se, or Te. Representative examples metal dichalcogenide intercalation materials include lithium intercalated in sulfides and selenides of Ti, V, Cr, Zr, Nb, Mo, Hf, Ta, and W, such as $TiS_2$, $VS_2$, $TiSe_2$ and $NbSe_2$, yielding materials such as $LiTiS_2$, $LiVS_2$, $LiTiSe_2$ and $LiNbSe_2$.

Phosphate based intercalation materials with olivine structure provide a class of polyanion lithium intercalation cathode materials that can find use as ion-exchange fillers 22 in a composite membrane 12. Such olivine type materials, hereinafter referred to as "olivines", are typically metal phosphates with ordered-olivine structures which together with lithium form intercalation materials having general formula $LiMPO_4$, where M in this instance is Co, Ni, Mn, Fe, and Cu. Commonly used olivines include lithium iron phosphate $LiFePO_4$ ("LFP") and lithium manganese phosphate $LiMnPO_4$. Typical variants of $LiMnPO_4$ feature one or more transition metals, such as iron, cobalt and/or nickel on the Mn site, for instance iron manganese phosphates of formula $Li(Mn_xFe_{1-x})PO_4$ ("LFMP") such as $Li(Mn_{0.6}Fe_{0.4})PO_4$, cobalt manganese phosphates of formula $Li(Mn_xCo_{1-x})PO_4$ such as $Li(Mn_{0.5}Co_{0.5})PO_4$, and cobalt nickel Mn phosphates, such as $Li(Mn_xCo_yNi_z)PO_4$ (where $x+y+z=1$), for example $Li(Mn_{0.33}Co_{0.33}Ni_{0.33})PO_4$. Other types of polyanion intercalation materials include silicates such as $Li_2FeSiO_4$ and tavorites such as $LiFeSO_4F$ and $LiVPO_4F$.

A representative spinel intercalation material is that formed by the intercalation of lithium in spinel $Mn_2O_4$, yielding the intercalation material commonly known as $LiMn_2O_4$. In other spinel-type intercalation materials the $Mn^{3+}$ is partially substituted with one or more cations such as $Li^+$, $Ni^{2+}$, $Zn^{2+}$, $Mg^{2+}$, $Al^{3+}$, $Cr^{3+}$, $Co^{3+}$, $Ga^{3+}$, $Ti^{4+}$, such as $LiNi_{0.5}Mn_{0.5}O_4$. $Li_4Ti_5O_{12}$ provides another example spinel intercalation material. Also amenable for use as lithium ion-conductive fillers are layered lithium cathode materials such as $LiNi_{0.33}Mn_{0.33}Co_{0.33}O_2$, and $LiNi_{0.5}Mn_{0.5}O_2$.

In instances calling for a sodium ion conductive composite membrane 12, representative sodium intercalation materials traditionally used as cathode materials in Na-ion batteries can be repurposed as sodium conductive fillers 22 in a similar fashion to that of their lithium analogs. A representative family of sodium intercalation materials is provided by sodium layered oxide compounds of general formula $Na_xMO_2$, where M is one or more transition metals and x is the coefficient for sodium intercalation, for example in $Na_xCoO_2$, $Na_xMnO_2$, $Na_xFeO_2$, $Na_xCrO_2$, and $Na[Ni_{0.33}Fe_{0.33}Mn_{0.33}]O_2$. Polyanionic types of sodium intercalation materials include sodium-intercalating olivines such as $NaFePO_4$ and $NaFe_{0.5}Mn_{0.5}PO_4$ and sodium vanadium fluorophosphates exemplified by $NaVPO_4F$, $Na_3V_2(PO_4)_2F_3$ and $Na_{1.5}VOPO_4F_{0.5}$.

Manufacturing the Composite Membranes

In representative embodiments, an ion-conducting composite membrane 12 may be produced by contacting a porous substrate 20 with the precursor of a selective ion-conducting filler 22, followed by processing the precursor to form the filler 22 disposed at least partially within the pores 24, where the filler 22 includes an intercalation material. The porous substrate 20 is preferably of a material having a porosity sufficient to establish ion conduction when an ion-conducting filler 22 is disposed within the pores 24. Materials having higher levels of porosity may also serve as the porous substrate 20, if desired. In representative embodiments, the porosity of the substrate 20 is about 5 vol % to about 80 vol %. Preferably, the porosity of the substrate 20 is about 7 vol % to about 15 vol %. More preferably, the porosity of the substrate 20 is about 10 vol % to about 14 vol %. The average diameter of the pores 24 is preferably about 100 nanometers (nm) to about 100 micrometers (μm).

In some embodiments, the precursor is a component of a solution applied to the porous substrate 20, and such precursor solution may also include a surfactant in order to obtain a thin film deposit on the surface of the porous substrate 20. A viscosity modifier may also be part of the solution. Alternatively, the porous substrate 20 may sit in a pool of the precursor solution. In some embodiments, the precursor solution is a sol-gel solution which may be applied to the porous substrate 20 at any time during gelification, allowing for a control of the quantity of solution absorbed by the porous substrate 20. For example, at an advanced state of gelification the interpenetration of the precursor solution in the porous substrate 20 may be minimal, while at the beginning of the gelification process the solution tends to be more deeply absorbed by the porous substrate 20. Usually, a thermal curing step is applied to promote the reactions transforming the precursor into the ion-conducting filler 22 and to form a crystal structure capable of reversibly intercalating one or more ions. In additional embodiments, the precursor is a component of a vapor and the formation of the filler 22 may entail, for example, chemical vapor deposition, sputter deposition, pulsed laser deposition, and/or electron beam deposition.

Electrochemical Applications

The composite membranes 12 of the present application are of interest in any electrochemical applications where only selected species must be allowed to reach one of the electrodes 14, 16. In some embodiments, a composite membrane 12 according to the present application is fitted to an energy storage device, where the composite membrane 12 is disposed between the positive electrode 14 and the negative electrode 16 of the device. As ion-conductive composite membranes 12 do not suffer from the geometry or size limitations of traditional membranes, energy storage systems can be assembled in larger sizes and with higher capacities of storage, reducing the cost of the energy stored by decreasing the number of necessary electrochemical cells 10 in the system. Example electrochemical cell 10 energy storage devices include Li-ion batteries, Na-ion batteries, liquid metal batteries, molten salt batteries such as sodium-sulfur batteries and sodium nickel chloride batteries.

Other representative embodiments envision the application of the composite membrane 12 to electrolytic cells for the electro-production or electro-refining of desired chemical species. To this end, the ion selectivity of the composite membrane 12 can be tuned according to the requirements of the electrochemical process at hand, such as metal extraction and metal refining. The application of the composite membrane 12 to fuel cells is also contemplated.

EXAMPLES

Example 1: Lithium-Conducting Composite Membrane

An ion-conducting composite membrane was prepared from a porous carbon substrate and lithium-ion intercalating $TiO_2$ material. The porous carbon substrate was made from graphite and had approximately 12 vol % of porosity, and could be prepared in many different geometrical shapes (e.g., disc, cylindrical crucible, or square crucible). The lithium intercalating $TiO_2$ material was prepared by sol-gel technique from a solution of titanium ethoxide, acid catalyst (HCl), and Pluronic® P-123 (BASF Corporation) surfactant in 1-butanol solvent. The molar ratio of the ingredients was fixed as 1 for titanium ethoxide, 2 for HCl, 0.013 Pluronic® P-123 and 9 for 1-butanol.

Figure 2:
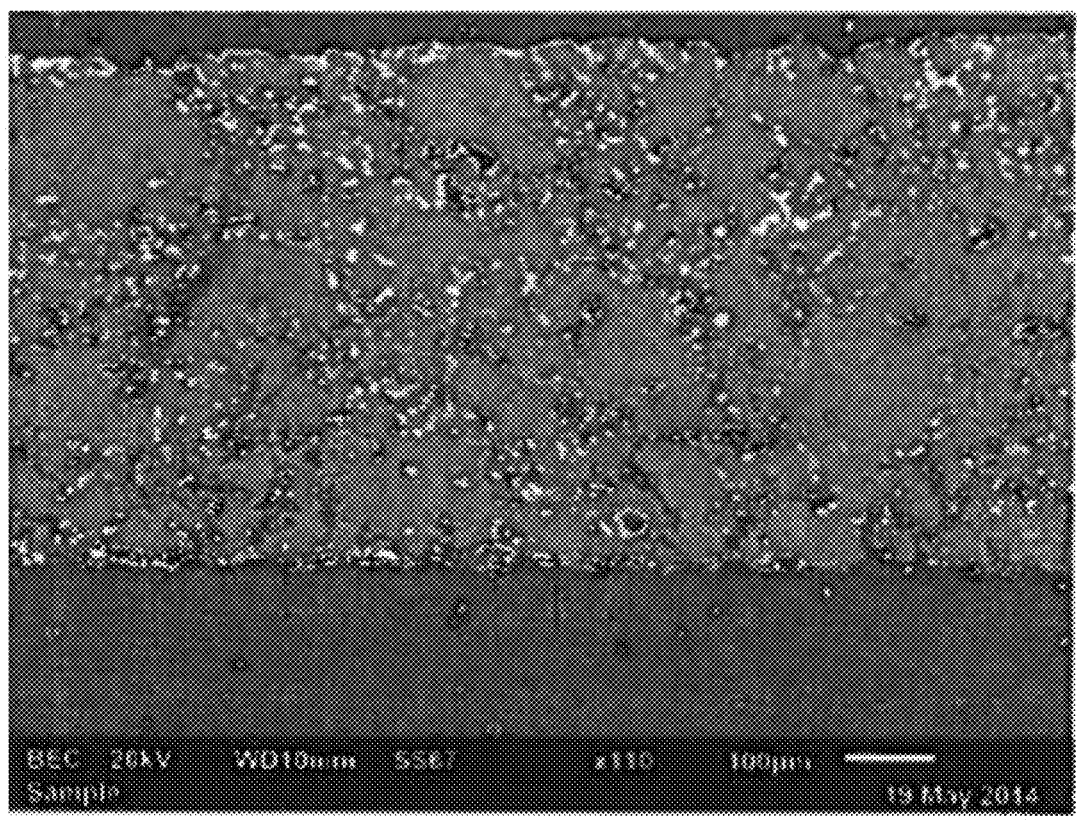
FIG. 2 is a cross-sectional view obtained by scanning electron microscope of a carbon-$TiO_2$ composite ion-conducting membrane according to embodiments of the present invention.
Figure 3:
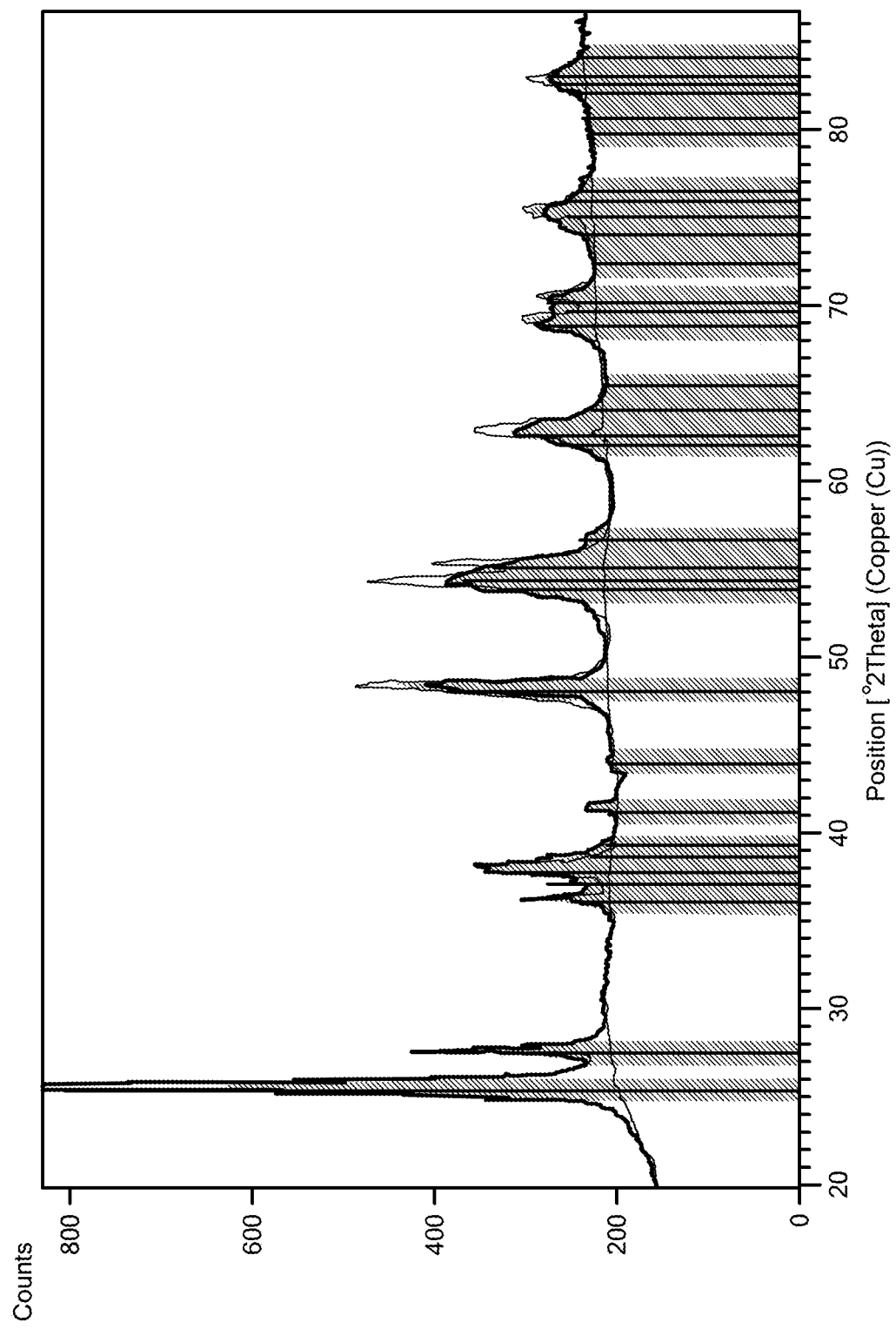
FIG. 3 shows an X-ray diffraction pattern of $TiO_2$ obtained by sol-gel synthesis on a carbon substrate according to embodiments of the present invention.
Figure 4:
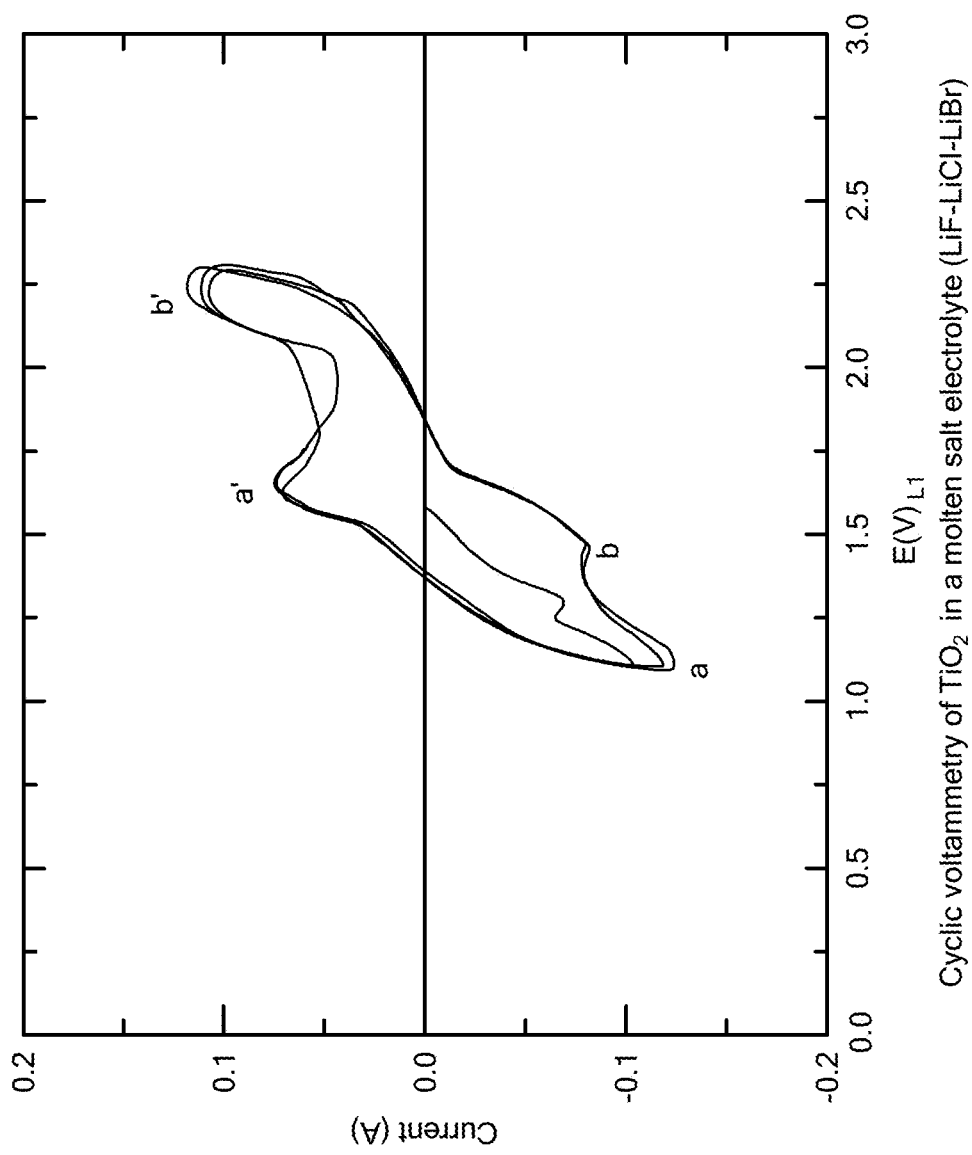
FIG. 4 shows the cyclic voltammetry of $TiO_2$ in a molten salt according to embodiments of the present invention.

The solution was applied on the surface of the porous substrate (20 drops per $cm^2$) and kept at 25° C. and 80% RH for 48 hours during gelification. The composite membrane was then heat-treated in air at 400° C. for 4 hours. FIG. 2 includes a cross-sectional view obtained by scanning electron microscope (SEM) of the product carbon-$TiO_2$ composite membrane, where the SEM contrast reveals the carbon porosity filled with $TiO_2$ (white marks). FIG. 3 shows the X-ray diffraction pattern of the $TiO_2$ obtained by sol-gel synthesis on the carbon substrate, where the dark and light peaks indicated the anatase and rutile phases, respectively. FIG. 4 is a cyclic voltammogram of the $TiO_2$ of the composite membrane in a high temperature molten salt electrolyte (LiF—LiCl—LiF). The cyclic voltammogram was performed at a temperature 550° C. and at a scanning rate of 1 mV/s, starting from the open circuit potential (OCV), down to a lower voltage limit of 1.1 V and up to a higher voltage limit of 2.3 V, where the negative peaks (a,b) and the positive peaks (a',b') demonstrate the lithium intercalation and deintercalation from $TiO_2$, respectively.

Example 2: Electrochemical Cell

A composite membrane was prepared by the method described in Example 1 and was used to separate an electrochemical cell in two compartments. In one compartment, was placed the material to be refined or the source of a metal to be extracted, preferably in the molten state, and an inert electrode. The second compartment was filled with an electrolyte and an active electrode where the metal will be reduced. This electrochemical cell system allows for selectively extracting ions from one compartment and therefore can be used for metallurgical extraction or refining.

What is claimed is:

1. An electrochemical cell comprising:
a positive electrode;
a negative electrode;
an electrolyte disposed between the positive electrode and the negative electrode; and
an ion-conducting composite membrane disposed between the positive electrode and the negative electrode, the composite membrane comprising:
a porous substrate having pores and a porosity from about 7 vol % to about 15 vol %; and
an amount of selective ion-conductive filler disposed at least partially within the pores, the amount of filler configured to establish a desired level of selective ionic conductance without affecting mechanical properties of the composite membrane, the filler including an intercalation material which selectively and reversibly intercalates and deintercalates one or more ions and enables ions to migrate through the intercalation material.

2. The electrochemical cell of claim 1, wherein the porous substrate comprises a material selected from the group consisting of graphite, glassy carbon, nickel, tungsten, stainless steel, magnesium oxide, boron nitride, and combinations thereof.

3. The electrochemical cell of claim 1, wherein the intercalation material is selected from the group consisting of transition metal oxides, metal dichalcogenides, olivines, tavorites, spinels, layered materials, and combinations thereof.

4. The electrochemical cell of claim 3, wherein the intercalation material is selected from the group consisting of $LiTiO_2$, $LiMnO_2$, $LiFeO_2$, $LiCoO_2$, $LiNiO_2$, $VS_2$, $TiSe_2$, $NbSe_2$, $LiTiS_2$, $LiVS_2$, $LiTiSe_2$, $LiNbSe_2$, $LiMnPO_4$, $Li(Mn_xFe_{1-x})PO_4$, $Li(Mn_xCo_{1-x})PO4$, $Li(Mn_xCo_yNi_z)PO_4$, $Li_2FeSiO_4$, $LiFeSO_4F$, $LiVPO_4F$, $LiMn_2O_4$, $LiNi_{0.5}Mn_{0.5}O_4 \cdot Li_4Ti_5O_{12}$, $LiNi_{0.33}Mn_{0.33}Co_{0.33}O_2$, $LiNi_{0.5}Mn_{0.5}O_2$, $Na_xCoO_2$, $Na_xMnO_2$, $Na_xFeO_2$, $Na_xCrO_2$, $Na[Ni_{0.33}Fe_{0.33}Mn_{0.33}]O_2$, $NaFePO_4$, $NaFe_{0.5}Mn_{0.5}PO_4$, $NaVPO_4F$, $Na_3V_2(PO_4)_2F_3$, $Na_{1.5}VOPO_4F_{0.5}$, and combinations thereof.

5. The electrochemical cell of claim 1, wherein the selective ion-conductive filler conducts an ion of an element selected from the group consisting of hydrogen, Li, Na, K, Ca, Mg, Fe, Fe, Sn, Co, Cu, Ag, Au, and combinations thereof.

6. The electrochemical cell of claim 1, wherein the porous substrate has an average pore diameter of about 100 nm to about 100 μm.

7. The electrochemical cell of claim 1, where the electrochemical cell is an energy storage device, an electrolytic cell, and/or a fuel cell.

8. The electrochemical cell of claim 7, wherein the electrochemical cell is a molten salt battery.

9. The electrochemical cell of claim 8, wherein the molten salt battery is selected from the group consisting of a sodium-sulfur battery, a sodium-nickel chloride battery, and combinations thereof.

10. The electrochemical cell of claim 1, wherein the positive electrode forms a first direct interface with the composite membrane and wherein the negative electrode forms a second direct interface with the composite membrane.

11. The electrochemical cell of claim 1, the electrolyte being disposed between the positive electrode and the composite membrane and between the negative electrode and the composite membrane.

12. A method of operating an electrochemical cell, the method comprising:
providing the electrochemical cell comprising:
a positive electrode;
a negative electrode;
an electrolyte disposed between the positive electrode and the negative electrode; and
an ion-conducting composite membrane disposed between the positive electrode and the negative electrode, the composite membrane comprising:
a porous substrate having pores and a porosity from about 7 vol % to about 15 vol %; and
a selective ion-conductive filler disposed at least partially within the pores, the amount of filler configured to establish a desired level of selective ionic conductance without affecting mechanical properties of the composite membrane, the filler including an intercalation material which selectively and reversibly intercalates and deintercalates one or more ions and enables ions to migrate through the intercalation material;
establishing an electrically conductive connection between an external circuit and the positive electrode and the negative electrode; and
operating the external circuit so as to convert electrical energy into chemical energy in the cell or to convert chemical energy from the cell into electrical energy by driving transfer of ions through the composite membrane.

13. The method of claim 12, wherein the electrochemical cell is an energy storage device, an electrolytic cell, and/or a fuel cell.

14. The method of claim 12, wherein the electrochemical cell is an electrolytic cell and the ions are metal ions.

15. The method of claim 14, wherein the metal ions are ions of a metal selected from the group consisting of Li, Na, K, Ca, Mg, Fe, Fe, Sn, Co, Cu, Ag, Au, and combinations thereof.

16. The method of claim 12, wherein the intercalation material is selected from the group consisting of transition metal oxides, metal dichalcogenides, olivines, tavorites, spinels, layered materials, and combinations thereof.

17. The method of claim 12, wherein the intercalation material is selected from the group consisting of $LiTiO_2$, $LiMnO_2$, $LiFeO_2$, $LiCoO_2$, $LiNiO_2$, $VS_2$, $TiSe_2$, $NbSe_2$, $LiTiS_2$, $LiVS_2$, $LiTiSe_2$, $LiNbSe_2$, $LiMnPO_4$, $Li(Mn_xFe_{1-x})PO_4$, $Li(Mn_xCo_{1-x})PO4$, $Li(Mn_xCo_yNi_z)PO_4$, $Li_2FeSiO_4$, $LiFeSO_4F$, $LiVPO_4F$, $LiMn_2O_4$, $LiNi_{0.5}Mn_{0.5}O_4$.$Li_4Ti_5O_{12}$ $LiNi_{0.33}Mn_{0.33}Co_{0.33}O_2$, $LiNi_{0.5}Mn_{0.5}O_2$, $Na_xCoO_2$, $Na_xMnO_2$, $Na_xFeO_2$, $Na_xCrO_2$, $Na[Ni_{0.33}Fe_{0.33}Mn_{0.33}]O_2$, $NaFePO_4$, $NaFe_{0.5}Mn_{0.5}PO_4$, $NaVPO_4F$, $Na_3V_2(PO_4)_2F_3$, $Na_{1.5}VOPO_4F_{0.5}$, and combinations thereof.

18. A method for manufacturing an ion-conducting composite membrane for use within an electrochemical cell, the method comprising:
providing a porous substrate having pores and a porosity from about 7 vol % to about 15 vol %;
contacting the porous substrate with a selective ion-conductive filler precursor; and
processing the precursor to form a selective ion-conductive filler disposed at least partially within the pores, the filler including an intercalation material which selectively and reversibly intercalates and deintercalates one or more ions and enables ions to migrate through the intercalation material.

19. The method of claim 18, wherein the precursor is in a sol-gel solution and the processing includes gelling and curing the sol-gel solution.

20. The method of claim 19, wherein the sol-gel solution further comprises a viscosity adjuster.

21. The method of claim 18, wherein the processing further includes thermally curing the precursor.

22. The method of claim 18, wherein the precursor is in a vapor and the processing is chemical vapor deposition, sputter deposition, pulsed laser deposition, and/or electron beam deposition.

* * * * *